United States Patent
Harada et al.

(10) Patent No.: US 10,651,466 B2
(45) Date of Patent: May 12, 2020

(54) ACTIVE MATERIAL, NONAQUEOUS ELECTROLYTE BATTERY, AND BATTERY PACK

(71) Applicant: KABUSHIKI KAISHA TOSHIBA, Minato-ku (JP)

(72) Inventors: Yasuhiro Harada, Isehara (JP); Kazuomi Yoshima, Tokyo (JP); Norio Takami, Yokohama (JP); Hiroki Inagaki, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 33 days.

(21) Appl. No.: 14/847,053

(22) Filed: Sep. 8, 2015

(65) Prior Publication Data

US 2016/0079588 A1    Mar. 17, 2016

(30) Foreign Application Priority Data

Sep. 16, 2014  (JP) .................. 2014-188241

(51) Int. Cl.
*H01M 4/485* (2010.01)
*C01G 35/00* (2006.01)
(Continued)

(52) U.S. Cl.
CPC .......... *H01M 4/485* (2013.01); *C01G 35/006* (2013.01); *H01M 10/0525* (2013.01);
(Continued)

(58) Field of Classification Search
CPC .... H01M 4/485; H01M 2/348; H01M 10/052; H01M 10/0525; C01G 35/006;
(Continued)

(56) References Cited

U.S. PATENT DOCUMENTS

| 4,824,222 A | 4/1989 | Green |
| 2010/0055565 A1 | 3/2010 | Naoi et al. |

(Continued)

FOREIGN PATENT DOCUMENTS

| CN | 101667636 A | 3/2010 |
| CN | 102326282 A | 1/2012 |

(Continued)

OTHER PUBLICATIONS

Clima, Sergiu, et al. "Dielectric response of Ta2O5, Nb2O5, and NbTaO5 from first-principles investigations." Journal of The Electrochemical Society 157.1 (2010): G20-G25.*

(Continued)

*Primary Examiner* — Milton I Cano
*Assistant Examiner* — Philip A. Stuckey
(74) *Attorney, Agent, or Firm* — Oblon, McClelland, Maier & Neustadt, L.L.P.

(57) ABSTRACT

According to one embodiment, there is provided an active material. The active material includes a composite oxide having an orthorhombic structure. The composite oxide is represented by the general formula $Ti_2(Nb_{1-x}Ta_x)_2O_9$ ($0 \leq x \leq 1$). The composite oxide has an average valence of niobium and/or tantalum of 4.95 or more.

19 Claims, 5 Drawing Sheets

(51) Int. Cl.
*H01M 10/0525* (2010.01)
*H01M 10/052* (2010.01)
*H01M 2/34* (2006.01)
*C01G 23/00* (2006.01)

(52) U.S. Cl.
CPC ........ *C01G 23/003* (2013.01); *C01P 2002/76* (2013.01); *C01P 2002/77* (2013.01); *C01P 2006/40* (2013.01); *H01M 2/348* (2013.01); *H01M 10/052* (2013.01)

(58) Field of Classification Search
CPC ............... C01G 23/003; C01P 2006/40; C01P 2002/76; C01P 2002/77
See application file for complete search history.

(56) References Cited

U.S. PATENT DOCUMENTS

| | | | |
|---|---|---|---|
| 2011/0223480 | A1 | 9/2011 | Wee et al. |
| 2012/0129015 | A1 | 5/2012 | Inagaki et al. |
| 2012/0244442 | A1* | 9/2012 | Harada ................ H01M 4/485 429/221 |
| 2013/0209863 | A1 | 8/2013 | Harada et al. |
| 2013/0216868 | A1 | 8/2013 | Inagaki et al. |
| 2014/0120380 | A1 | 5/2014 | Inagaki et al. |
| 2015/0221939 | A1 | 8/2015 | Buannic et al. |
| 2015/0364757 | A1 | 12/2015 | Buannic et al. |

FOREIGN PATENT DOCUMENTS

| | | |
|---|---|---|
| CN | 103247794 A | 8/2013 |
| CN | 103794772 | 5/2014 |
| FR | 2 996 838 A1 | 4/2014 |
| FR | 3 001 725 A1 | 8/2014 |
| JP | 64-45708 | 2/1989 |
| JP | 2567226 B2 | 12/1996 |
| JP | 2009-21102 | 1/2009 |
| JP | 2010-80188 | 4/2010 |
| JP | 2010-287496 | 12/2010 |
| JP | 2012-502467 | 1/2012 |
| JP | 5531301 B2 | 6/2014 |
| WO | WO 2014/060662 A1 | 4/2014 |

OTHER PUBLICATIONS

Extended European Search Report dated Jun. 9, 2016 in Patent Application No. 15182929.8.

Office Action dated Aug. 2, 2016 in Korean Patent Application No. 10-2015-0126076 with English translation.

A.D. Wadsley, "Alkali titanoniobates: The crystal structures of $KTiNbO_5$ and $KTi_3NBO_9$", Acta Cryst. vol. 17., Part 6, Jun. 1964, pp. 623-628.

Mingming Fang et at, "Dielectric Properties of the Lamellar Niobates and Titanoniobates $AM_2Nb_3O_{10}$ and $ATiNbO_5$ (A = H, K, M = Ca, Pb), and Their Condensation Products $Ca_4Nb_6O_{19}$ and $Ti_2Nb_2O_9$", Chem.. Mater., vol. 11, No. 6, 1999, pp. 1519-1525.

Partial Search Report dated Feb. 26, 2016 in European Patent Application No. 15182929.8.

J.F. Colin, et al., "Lithium Insertion in an Oriented Nanoporous Oxide with a Tunnel Structure: $Ti_2Nb_2O_9$", Chemistry of Materials, 2008, vol. 20, No. 4. XP055016276, pp. 1534-1540.

Mingming Fang, et al., "Layer-by-Layer Growth and Condensation Reactions of Niobate and Titanoniobate Thin Films", Chemistry of Materials,1999, vol. 11, XP002569961, pp. 1526-1532.

B.M. Gatehouse, et al., "Preparation and Structure Refinement of $KTi_3TaO_9$ and $K_3TiTa_7O_{21}$", Journal of Solid State Chemistry, 1981, vol. 39, No. 1, XP024193244, pp. 1-6.

Combined Office Action and Search Report dated May 31, 2017 in Chinese Patent Application No. 20151056783.5 (with English translation).

\* cited by examiner

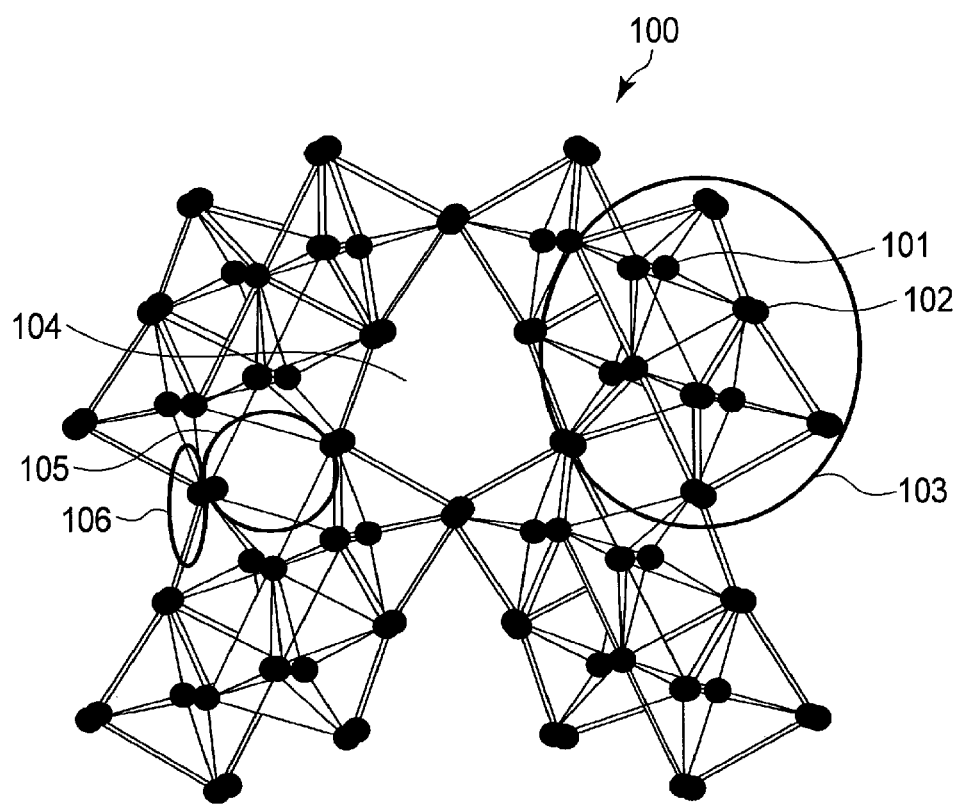
F I G. 1

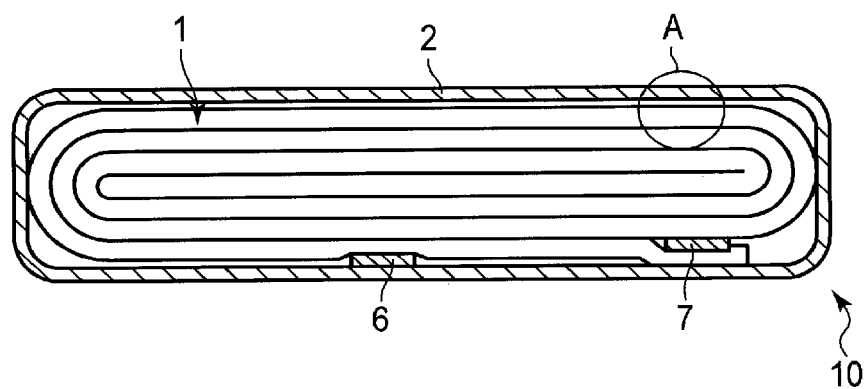
F I G. 2
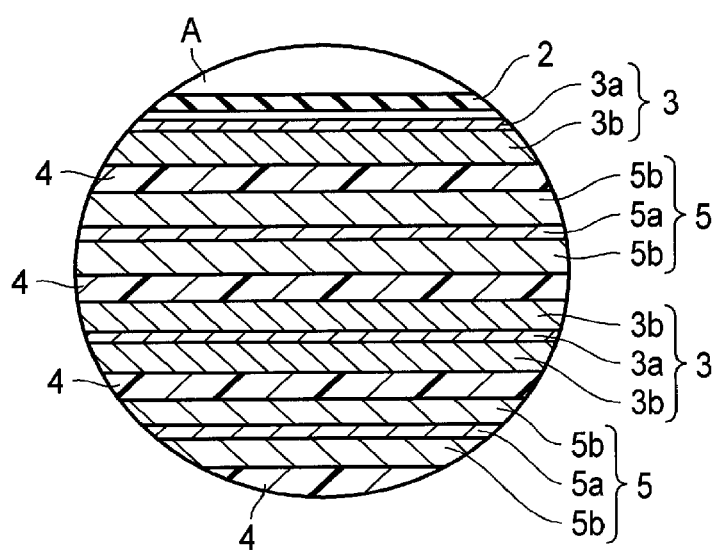
F I G. 3

ACTIVE MATERIAL, NONAQUEOUS ELECTROLYTE BATTERY, AND BATTERY PACK

CROSS-REFERENCE TO RELATED APPLICATIONS

This application is based upon and claims the benefit of priority from the Japanese Patent Application No. 2014-188241, filed Sep. 16, 2014, the entire contents of which are incorporated herein by reference.

FIELD

Embodiments described herein relate generally to an active material, a nonaqueous electrolyte battery and a battery pack.

BACKGROUND

Recently, a nonaqueous electrolyte battery such as a lithium-ion secondary battery has been actively developed as a battery having a high energy density. The nonaqueous electrolyte battery is expected to be used as a power source for vehicles such as hybrid vehicles or electric cars or an uninterruptible power supply for a mobile phone base station. Therefore, the nonaqueous electrolyte battery is desired to have other performance such as rapid charge-and-discharge performance and long-term reliability. For example, a nonaqueous electrolyte battery enabling rapid charge and discharge not only remarkably shortens the charging time but also makes it possible to improve performance related to motivity and to efficiently recover regenerative energy from motivity, in a hybrid vehicle and the like.

In order to enable rapid charge and discharge, it is necessary for electrons and lithium ions to be able to migrate rapidly between the positive electrode and the negative electrode. When a battery using a carbon-based material in the negative electrode undergoes repeated rapid charge and/or discharge, dendrite precipitation of metal lithium can occur on the electrode. Dendrites cause internal short circuits, which can lead to heat generation and fires.

In light of this, a battery using a metal composite oxide in the negative electrode in place of a carbonaceous material has been developed. Particularly, in a battery using titanium oxide as the negative electrode active material, rapid charge and discharge can be performed stably. Such a battery also has a longer life than those using a carbonaceous material.

However, titanium oxide has a higher (nobler) potential relative to metal lithium than that of the carbonaceous material. In addition, titanium oxide has a lower capacity per weight. Therefore, a battery using titanium oxide in the negative electrode has a problem in that the battery has low energy density.

For example, an electrode potential of an electrode using titanium oxide is about 1.5 V based on metal lithium. This potential is higher (nobler) than that of the electrode using carbon-based negative electrode. The potential of titanium oxide is due to the redox reaction between $Ti^{3+}$ and $Ti^{4+}$ when lithium is electrochemically absorbed and released. Therefore, the potential of titanium oxide is limited electrochemically. Further, there is the fact that rapid absorption and release of lithium ions can be stably performed due to an electrode potential as high as about 1.5 V. Therefore, it is substantially difficult to lower the potential of the electrode to improve energy density.

Further, for the capacity of the battery per unit weight, the theoretical capacity of titanium dioxide having anatase structure is about 165 mAh/g, and the theoretical capacity of a lithium-titanium composite oxide such as $Li_4Ti_5O_{12}$ is about 180 mAh/g. On the other hand, the theoretical capacity of a general graphite-based electrode material is not less than 385 mAh/g. Therefore, the capacity density of titanium oxide is significantly lower than that of the carbon-based negative electrode. This is due to a reduction in substantial capacity because there are only a small number of lithium-absorption sites in the crystal structure and lithium tends to be stabilized in the structure.

BRIEF DESCRIPTION OF THE DRAWINGS

FIG. 1 is a schematic view showing a crystal structure of a composite oxide $Ti_2Nb_2O_9$ having an orthorhombic structure which may be contained in an active material according to a first embodiment;

FIG. 2 is a schematic sectional view of an example of a nonaqueous electrolyte battery according to a second embodiment;

FIG. 3 is an enlarged sectional view of the portion A in FIG. 2;

DETAILED DESCRIPTION

Figure 4:
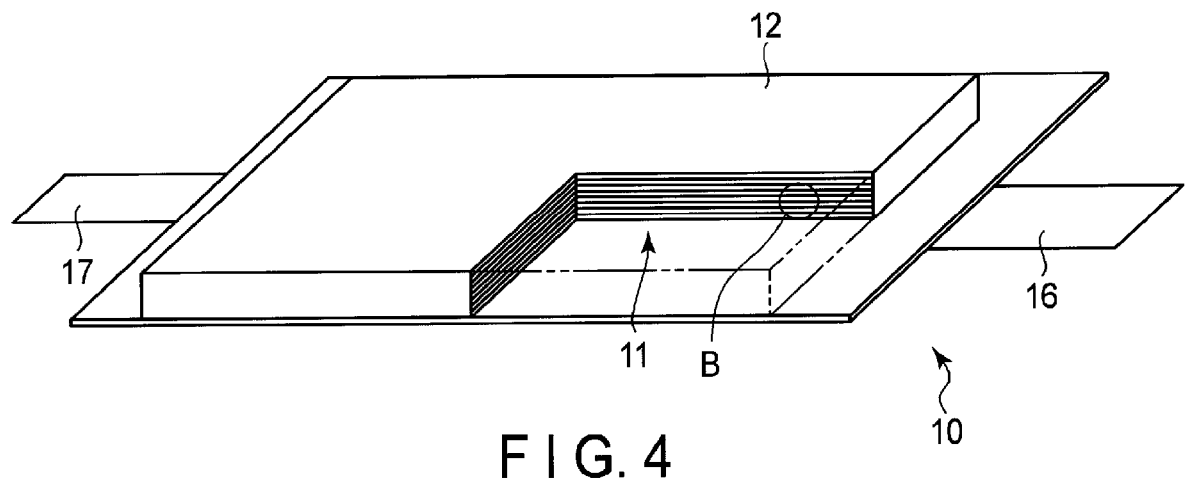
FIG. 4 is a partially cut perspective view schematically showing another example of a nonaqueous electrolyte battery according to the second embodiment.

In general, according to one embodiment, there is provided an active material. The active material includes a composite oxide having an orthorhombic structure. The composite oxide is represented by the general formula $Ti_2(Nb_{1-x}Ta_x)_2O_9$ ($0 \leq x \leq 1$). The composite oxide has an average valence of niobium and/or tantalum of 4.95 or more.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided an active material. The active material includes a composite oxide having an orthorhombic structure. The composite oxide is represented by the general formula $Ti_2(Nb_{1-x}Ta_x)_2O_9$ ($0 \leq x \leq 1$). The composite oxide has an average valence of niobium and/or tantalum of 4.95 or more.

A composite oxide having an orthorhombic structure represented by the general formula $Ti_2(Nb_{1-x}Ta_x)_2O_9$ ($0 \leq x \leq 1$) may have a lithium absorption potential of about 1.5 V (vs $Li/Li^+$). Thus, the active material according to the first embodiment can achieve a nonaqueous electrolyte battery which can stably exhibit rapid charge-and-discharge characteristics repeatedly.

Further, the composite oxide having an orthorhombic structure represented by the general formula $Ti_2(Nb_{1-x}Ta_x)_2O_9$ ($0 \leq x \leq 1$) can achieve a nonaqueous electrolyte battery which can exhibit not only rapid charge-and-discharge characteristics stably and repeatedly but also exhibit high energy density, for the reasons described below.

As an example of the composite oxide having an orthorhombic structure represented by the general formula $Ti_2(Nb_{1-x}Ta_x)_2O_9$ ($0 \leq x \leq 1$), a schematic view of the crystal structure of the composite oxide $Ti_2Nb_2O_9$ having an orthorhombic structure is shown in FIG. 1.

As shown in FIG. 1, a crystal structure 100 of the composite oxide $Ti_2Nb_2O_9$ having an orthorhombic structure includes metal ions 101 and oxide ions 102, which constitute skeletal structure portions 103. Note that in each metal ion 101, Nb and Ti ions are randomly arranged in a Nb/Ti ratio of 1:1. In the crystal structure 100 of the orthorhombic composite oxide $Ti_2Nb_2O_9$, the skeletal structure portions 103 are arranged three-dimensionally alternately. Thus, in the crystal structure 100 of the orthorhombic composite oxide $Ti_2Nb_2O_9$, a void 104 is present between the skeletal structures 103. The void 104 can serve as a host of lithium ion. As shown in FIG. 1, this void 104 can occupy a large part of the whole crystal structure 100. In addition, the void 104 can stably maintain the structure even when lithium ions are absorbed.

In FIG. 1, areas 105 and 106 are portions with three-dimensional void channels through which lithium ions can diffuse. The void has a tunnel structure advantageous for the conduction of lithium ions. Lithium ions can pass between the areas 105 and 106. Accordingly, the orthorhombic composite oxide $Ti_2Nb_2O_9$ enables lithium in the crystal structure 100 to be three-dimensionally diffused.

Thus, the crystal structure 100 of the orthorhombic composite oxide $Ti_2Nb_2O_9$ has a three-dimensional tunnel structure as described above, whereby the crystal structure has a large space into which lithium ions can be equivalently absorbed and is structurally stable. Further, the composite oxide $Ti_2Nb_2O_9$ having an orthorhombic structure includes three-dimensional channels enabling lithium in the crystal structure 100 to be easily diffused, whereby the lithium ions are effectively absorbed into and released from the voids acting as hosts for lithium, and the absorption and release space for lithium ions are effectually increased. The active material according to the first embodiment includes the composite oxide, so that it is possible to provide a nonaqueous electrolyte battery which can exhibit high capacity and excellent rate performance.

Note that the crystal structure 100 shown in FIG. 1 has the symmetry belonging to space group Pnmmm (No. 59) or Pn$2_1$m (No. 31) which are cited in the international tables for crystallography. Further, the plane indices herein are those in the case the indexing are performed based on the atomic coordinate of $KTi_3NbO_9$, which is a compound having a similar structure to that of the composite oxide included in the active material according to the first embodiment and described in A. D. Wadsley, Acta Cryst. 17, pp 623 (1964). The plane indices are also determined by the above space group.

Furthermore, The composite oxide having an orthorhombic structure represented by the general formula $Ti_2(Nb_{1-x}Ta_x)_2O_9$ ($0 \leq x \leq 1$) included in the active material according to the present embodiment contains not only Ti which is a tetravalent cation but also Nb and/or Ta which is a pentavalent cation. As will be described below, this is another reason that the active material according to the present embodiment can achieve a nonaqueous electrolyte battery which can exhibit high capacity.

With reference to FIG. 1 again, the orthorhombic composite oxide $Ti_2Nb_2O_9$ will be described as an example. In the orthorhombic composite oxide $Ti_2Nb_2O_9$, when lithium ions with a monovalent positive charge are absorbed in the void 104, only a portion among the metal ion 101 constituting the skeleton which corresponds to a monovalent is reduced, thereby maintaining electroneutrality of a crystal. In the orthorhombic composite oxide $Ti_2Nb_2O_9$, not only a tetravalent cation is reduced from tetravalent to trivalent but also a pentavalent cation is reduced from pentavalent to trivalent. For this, in the orthorhombic composite oxide $Ti_2Nb_2O_9$ which contains Nb as a pentavalent cation, the reduction number per weight of the active material is large, compared to that of a compound containing only a tetravalent cation. Therefore, the orthorhombic composite oxide $Ti_2Nb_2O_9$ ensures the electroneutrality of the crystal even if many lithium ions are absorbed. Thus, the orthorhombic composite oxide $Ti_2Nb_2O_9$ can increase the energy density, compared to the compound containing only a tetravalent cation such as titanium oxide. Specifically, the theoretical capacity of the orthorhombic composite oxide $Ti_2Nb_2O_9$ is about 408 mAh/g, and it is more than twice the value of the titanium oxide having a spinel structure.

In the case where the active material according to the first embodiment is used as a negative electrode active material, the composite oxide represented by the above general formula in a fully discharged state does not include lithium theoretically. However, even when the composite oxide represented by the above general formula is in a fully discharged state, lithium may remain. Even if lithium remains, the active material according to the first embodiment can achieve a nonaqueous electrolyte battery which can exhibit high capacity and excellent rate performance.

The orthorhombic composite oxide $Ti_2(Nb_{1-x}Ta_x)_2O_9$ has two tetravalent cations and two pentavalent cations per chemical formula. Therefore, theoretically, the orthorhombic composite oxide $Ti_2(Nb_{1-x}Ta_x)_2O_9$ enables six lithium ions to be introduced into a unit crystal structure. Accordingly, the orthorhombic composite oxide included in the active material according to the first embodiment can be represented by the general formula $Li_yTi_2(Nb_{1-x}Ta_x)_2O_9$. The subscript y may change from 0 to 6 depending on the charge-and-discharge state.

Further, niobium (Nb) and tantalum (Ta) elements are similar in chemical property and physical property to each other. Thus, even if the value of the subscript x changes within a range of from 0 to 1 in the general formula, the active material according to the first embodiment still can achieve a nonaqueous electrolyte battery which can exhibit high capacity and excellent rate performance. As an extreme example, the orthorhombic composite oxide may be an oxide $Ti_2Ta_2O_9$ having an orthorhombic structure in which all of Nb in $Ti_2Nb_2O_9$ have been replaced with Ta. In other words, in the composite oxide $Ti_2(Nb_{1-x}Ta_x)_2O_9$ having an orthorhombic structure, the subscript x may change from 0 to 1.

Further, the composite oxide having an orthorhombic structure represented by the general formula $Ti_2(Nb_{1-x}Ta_x)_2O_9$ may be represented by the general formula $Ti_2(Nb_{1-x}Ta_x)_2O_{9+\delta}$ ($0 \leq x \leq 1$ and $-0.3 \leq \delta \leq +0.3$).

The subscript $\delta$ represents a change in the valence of Nb and/or Ta in the composite oxide $Ti_2(Nb_{1-x}Ta_x)_2O_9$ having an orthorhombic structure, and a deviation from the stoichiometric ratios in the general formula $Ti_2(Nb_{1-x}Ta_x)_2O_9$ which is caused by the above valence change. The subscript δ may change depending on the reduced state of the composite oxide having an orthorhombic structure. The composite oxide having an orthorhombic structure represented by the general formula $Ti_2(Nb_{1-x}Ta_x)_2O_9$ in which the subscript δ is less than −0.3 is in a state where constituent elements Nb and/or Ta are excessively reduced. In the case where the composite oxide having an orthorhombic structure in such an excessively reduced state is used for a nonaqueous electrolyte battery, the electrode capacity is significantly reduced and it is impossible to achieve a nonaqueous electrolyte battery which can exhibit high capacity. On the other hand, the range of up to δ=+0.3 is considered to be within the measurement error due to an influence such as oxygen adsorbed on the surface or water content.

As described above, in the case of the composite oxide having an orthorhombic structure represented by the general formula $Ti_2(Nb_{1-x}Ta_x)_2O_{9+δ}$, the valence of Nb and/or Ta may vary depending on changes in the reduced state. However, in the composite oxide having an orthorhombic structure represented by the general formula $Ti_2(Nb_{1-x}Ta_x)_2O_9$ included in the active material according to the first embodiment, because the subscript δ is a value of from −0.3≤δ≤+0.3, the average valence of Nb and/or Ta is 4.95 or more.

On the other hand, in the case where the average valence of niobium (Nb) and/or tantalum (Ta) is less than 4.95, the composite oxide $Ti_2(Nb_{1-x}Ta_x)_2O_9$ having an orthorhombic structure is an oxide represented by the general formula $Ti_2(Nb_{1-x}Ta_x)_2O_{9+δ}$ (0≤x≤1) where δ is less than −0.3. In the case where such a composite oxide is used for a nonaqueous electrolyte battery as described above, the electrode capacity is significantly reduced and it is impossible to achieve a nonaqueous electrolyte battery which can exhibit high capacity.

The valence of niobium (Nb) and/or tantalum (Ta) in the composite oxide $Ti_2(Nb_{1-x}Ta_x)_2O_9$ having an orthorhombic structure is largely dependent on the method of producing the composite oxide having an orthorhombic structure. Specifically, as will be described in detail below, a composite oxide having an orthorhombic structure that has an average valence of Nb and/or Ta of 4.95 or more can be produced by a method including: sintering a precursor in the presence of oxygen to prevent niobium Nb and/or tantalum Ta from being reduced; or repairing oxygen defects after sintering of the precursor, such as an annealing process.

Note that, as described above, when the composite oxide having an orthorhombic structure represented by the general formula $Ti_2(Nb_{1-x}Ta_x)_2O_9$ absorbs lithium, Nb and/or Ta are reduced. As a result, the actually measured average valence of Nb and/or Ta in the composite oxide having an orthorhombic structure included in the active material according to the first embodiment, which is in a lithium-absorbed state, namely, which is represented by the general formula $Li_yTi_2(Nb_{1-x}Ta_x)_2O_9$ (0≤x≤1 and 0≤y≤6) may be smaller than 4.95. In this case, an actual measured value is corrected based on the consideration that niobium (Nb) and/or tantalum (Ta) is reduced by the lithium absorbed in the crystal structure, and the corrected value is defined as the average valence of Nb and/or Ta in the composite oxide $Ti_2(Nb_{1-x}Ta_x)_2O_9$ having an orthorhombic structure. A specific method will be described below.

The upper limit of the valence of niobium (Nb) and/or tantalum Ta in the composite oxide $Ti_2(Nb_{1-x}Ta_x)_2O_9$ having an orthorhombic structure is 5+.

Preferably, the active material according to the first embodiment, in addition to the composite oxide $Ti_2(Nb_{1-x}Ta_x)_2O_9$ having an orthorhombic structure, further contains at least one selected from the group consisting of a composite oxide represented by the general formula $H(Nb_{1-x}Ta_x)TiO_5$ (0≤x≤1), a composite oxide represented by the general formula $Ti(Nb_{1-x}Ta_x)_2O_7$ (0≤x≤1), and $TiO_2$, whereby the composite oxide $Ti_2(Nb_{1-x}Ta_x)_2O_9$ having an orthorhombic structure coexists with the further contained oxides in crystalline particles. Particularly, the active material according to the first embodiment more preferably contains the composite oxide $Ti(Nb_{1-x}Ta_x)_2O_7$ (0≤x≤1). The coexistence of the composite oxides $H(Nb_{1-x}Ti_x)O_5$ and/or $Ti(Nb_{1-x}Ta_x)_2O_7$ having a layer structure which includes a large amount of voids acting as hosts for lithium ions and allows the rapid planer diffusion of lithium ion with the oxide $Ti_2(Nb_{1-y}Ta_y)_2O_9$ having a three-dimensional tunnel structure in which lithium ion can be rapidly diffused enables the diffusion path for lithium ions in crystalline particles to be complementarily shortened. As a result, the active material according to the first embodiment which further contains the above-mentioned further contained composite oxide can achieve a nonaqueous electrolyte battery having further improved capacity and rate performance. On the other hand, $TiO_2$ is preferably one having an anatase structure. The anatase type $TiO_2$ has a property that can provide high electron conductivity when lithium ions are absorbed. Thus, in the case where the active material according to the first embodiment which further includes the anatase type $TiO_2$ is used in an electrode, the active material can easily form an electrical conductive network in the electrode. As a result, the active material according to the first embodiment which further includes the anatase type $TiO_2$ can achieve a nonaqueous electrolyte battery having further improved capacity and rate performance.

Subsequently, the form, the particle size, and the specific surface area of the active material according to the first embodiment will be described.

<Form>

The form of the active material according to the first embodiment is not particularly limited. For example, the active material according to the first embodiment may be in the form of primary particle or in the form of secondary particle in which primary particles are aggregated.

<Particle Size>

The average size of the active material according to the first embodiment is not particularly limited and may be changed according to desired battery characteristics.

<BET Specific Surface Area>

The BET specific surface area of the active material according to the first embodiment is not particularly limited. However, the BET specific surface area is preferably 5 $m^2/g$ or more and less than 200 $m^2/g$.

In the case where the specific surface area is 5 $m^2/g$ or more, the contact area with the electrolyte solution can be ensured, and therefore, good discharge-rate characteristics are easily obtained, and further the charging time can be reduced. On the other hand, in the case where the specific surface area is less than 200 $m^2/g$ or less, the reactivity with the electrolyte solution does not become too high, whereby lifetime characteristics can be improved. Further, it is possible to improve coating properties of a slurry containing the active material which is used to produce an electrode to be described below.

Here, the specific surface area is an area measured using a method including allowing molecules of which an occupied area in adsorption is known to be adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

[Production Method]

The active material according to the first embodiment can be produced in the following manner.

First, an alkali titanate compound as a starting material is provided. The alkali titanate compound used as the starting material may be prepared by a usual solid phase reaction method. For example, the alkali titanate compound may be synthesized by blending raw materials such as oxide or carbonate in a proper stoichiometric ratio and by heating the mixture. Specifically, an oxide or salt containing titanium is mixed with an oxide or salt containing Nb and/or Ta at a mole ratio for obtaining a layered compound represented by $KTi(Nb_{1-x}Ta_x)O_5$. The salts used as the raw materials are preferably salts which decompose at relatively low temperatures to form oxides, like carbonate and nitrate. Next, the obtained mixture is ground and blended as uniformly as possible, followed by calcination. The temporary calcination is performed at a temperature of from 600° C. to 850° C. for a total of 1 hour to 3 hours. After that, the temperature is increased and the sintering is performed at a temperature of from 1100° C. to 1500° C. At this time, it is preferable to prevent generation of lattice defects due to the oxygen defects. For example, a powder before the sintering is pressed into pellet or rod so as to decrease an area in contact with air and increase a contact area of particles with each other. Then, the resultant pellets or rods are sintered, whereby the generation of lattice defects can be suppressed. In the case of industrial mass production, it is preferable to repair the oxygen defects by sintering the raw powder under an atmosphere with a high oxygen partial pressure such as under an oxygen atmosphere, or performing a heat-treatment (annealing) at a temperature of from 400° C. to 1000° C. after the sintering in a usual air atmosphere. When the generation of lattice defects is not suppressed, niobium is reduced in advance, which may result in formation of a precursor having significantly low crystallinity. Since the oxide $Ti_2(Nb_{1-x}Ta_x)O_9$ synthesized using such a starting material has low crystallinity and niobium is reduced in advance, the charge and discharge capacity is also assumed to be significantly low. More preferably, the annealing temperature is in a range of from 600° C. to 800° C. This is because the oxygen defects tend to be quickly repaired by annealing in the above temperature range.

Then, the obtained powder of $KTi(Nb_{1-x}Ta_x)O_5$ is sufficiently washed with distilled water in order to remove impurities included in the powder. Thereafter, 0.5 to 4 M of an acid such as hydrochloric acid, nitric acid or sulfuric acid is added to the washed powder of $KTi(Nb_{1-x}Ta_x)O_5$, followed by stirring. As a result of the acid treatment, potassium ions in an alkali niobium titanate compound $KTi(Nb_{1-x}Ta_x)O_5$ is exchanged for protons to yield a proton-exchanged compound $HTi(Nb_{1-x}Ta_x)O_5$. Desirably, the acid treatment is carried out until protons are completely exchanged.

In the case where the acid treatment is carried out at room temperature (about 25° C.) using about 1 M of hydrochloric acid, the time required for the acid treatment is preferably from 24 hours or more and more preferably 1 to 2 weeks. Further, the acid solution is preferably exchanged for a new one, for example, every 24 hours to ensure the progress of proton exchange. In the case of industrial synthesis, the temperature of the solution for the acid treatment is increased to about 60° C., whereby the time required for proton exchange can be greatly reduced. In the case where the concentration of alkali cations in an intermediate $HTi(Nb_{1-x}Ta_x)O_5$ which have been completely exchanged for protons is expressed as 0 mol %, the concentration of the alkali metal (K) remaining after proton exchange is preferably 5 mol % or less.

When the proton exchange is completed, an alkaline solution such as an aqueous solution of lithium hydroxide may be added to neutralize the residual acid. This process enables reactive groups on the material surface or lithium ion trapping sites to be reduced, and also expects improvements in first charge-and-discharge cycle efficiency and cycle performance of the electrode. After the proton exchange is completed, the reaction product is washed with distilled water. Although the degree of washing is not particularly limited, the reaction product is preferably washed until the pH of rinse water reaches a range of from 6 to 8.

Then, the product is dried to obtain a proton-exchanged compound $HTi(Nb_{1-x}Ta_x)O_5$ as an intermediate product. Note that, here, the process of neutralization washing of residual acid and the drying process may be omitted and the obtained proton-exchanged compound may be subjected to a heat treatment process.

Such an ion exchange method enables alkali cations to be exchanged for protons without destroying the crystal structure of the alkali titanate compound.

Preferably, the raw material compound is ground by a ball mill before the ion exchange method so that proton exchange is smoothly accomplished. In the grinding, in a container having a volume of 100 cm$^2$, zirconia balls having a diameter of about 10 mm to 15 mm are used and the ball mill is rotated at 600 to 1000 rpm for about 15 minutes to 3 hours. When the rotating time is 15 minutes or less, this is not preferred because the raw material is not ground sufficiently. Further, when the raw material is ground for a time as long as 3 hours or more, it may be phase-separated into a compound different from a target product or the crystallinity may be significantly reduced because a mechanochemical reaction proceeds. This is not preferred.

Next, the obtained proton-exchanged compound is heat-treated to obtain a composite oxide having an orthorhombic structure represented by the general formula $Ti_2(Nb_{1-x}Ta_x)_2O_9$ as a target product. The inventors have found that optimum heating conditions differ depending on the composition, the particle size, and the crystallinity of the starting material, and the condition for the proton exchange. Therefore, it is necessary to appropriately determine the optimal heating condition in accordance with the starting material. The present inventors have found out that, even if any starting material is used, adjusting the heating temperature and the heating time allows for formation of a single crystal phase of the composite oxide having an orthorhombic structure represented by the general formula $Ti_2(Nb_{1-x}Ta_x)_2O_9$, or alternatively optional formation of mixed phase in which the orthorhombic composite oxide coexist with a further oxide and/or composite oxide such as $H(Nb_{1-x}Ta_x)TiO_5$, $Ti(Nb_{1-x}Ta_x)_2O_7$, and $TiO_2$.

Preferably, an electric furnace is heated in advance to perform a precise heat treatment. The sample is introduced into the electric furnace after the electric furnace reaches a set temperature. After the sample is heated under heating conditions which are determined specifically for the sample, the sample is taken out of the furnace immediately, followed by rapid cooling in air. This enables the heating conditions to be set exactly.

The temperature required for heat-treatment of the proton-exchanged compound is preferably in a range of from 260° C. to 600° C. In the case of a range of from 260° C. to 300° C., a mixed phase of $H(Nb_{1-x}Ta_x)TiO_5$ and $Ti_2(Nb_{1-x}Ta_x)_2O_9$ crystals can be obtained. When the heating temperature is in a range of from 350° C. to 400° C., a single phase of $Ti_2(Nb_{1-x}Ta_x)_2O_9$ crystal can be formed, which is thus preferred. Further, when the heating temperature is in a range of from 400° C. to 600° C., this is more preferred because particles that contain coexisting $Ti_2(Nb_{1-x}Ta_x)_2O_9$ crystal coexists with $Ti(Nb_{1-x}Ta_x)_2O_7$ and $TiO_2$ crystals can be obtained. When the heating temperature is 260° C. or more, this is preferred because a dehydration reaction rapidly proceeds, which improves the crystallinity, bringing about improvements in electrode capacity, charge-and-discharge efficiency, and repetitive characteristics. On the other hand, when the heating temperature is 600° C. or less, this is preferable because the progress of a dehydration reaction is not too fast and the phase formation is easily controlled.

The thus synthesized composite oxide $Ti_2(Nb_{1-x}Ta_x)_2O_9$ having an orthorhombic structure is converted to $Li_yTi_2(Nb_{1-x}Ta_x)_2O_9$ crystal (y>0), after the composite oxide is incorporated into the negative electrode, followed by charging. Alternatively, a composite oxide having an orthorhombic structure that originally contains lithium can be obtained by using a compound that contains lithium such as lithium carbonate, or using lithium hydroxide as a synthetic raw material.

In the above-described method, due to the treatment for suppressing the generation of the oxygen defects and/or the treatment for repairing the oxygen defects such as annealing, a proportion of a part among Nb and/or Ta in an alkali niobium (tantalum) titanate compound $KTi(Nb_{1-x}Ta_x)O_5$ as an intermediate which has been reduced is allowed to be close to 0, whereby an alkali niobium (tantalum) titanate compound $KTi(Nb_{1-x}Ta_x)O_5$ having high crystallinity can be obtained. As a result, it is possible to obtain a composite oxide $Ti_2(Nb_{1-x}Ta_x)_2O_9$ having an orthorhombic structure that has an average valence of Nb and/or Ta of 4.95 or more.

[Measurement Method]

<Powder X-Ray Diffraction Measurement>

The crystal structure of the compound included in the active material can be confirmed by subjecting the active material to powder X-ray diffraction (XRD).

The powder X-ray diffraction measurement of the active material is performed as follows.

First, a target sample is ground until the average particle size becomes about 5 µm. The average particle size can be determined by the laser diffractometry. A holder portion with a depth of 0.2 mm formed on a glass sample plate is filled with the ground sample. In this case, care must be taken to fill the holder portion with the sample sufficiently. Further, further care must be taken to prevent the occurrence of cracks and voids caused by an insufficient filling of the sample. Then, another glass plate is sufficiently pressed against the sample from the outside to smooth the plane of the sample. In this case, care must be taken to avoid too much or too little amount of the sample to be filled, thereby preventing the generation of parts which are depressed or protruded from the standard level of the holder. Then, the glass plate filled with the sample is placed in a powder X-ray diffractometer and a diffraction pattern is obtained using Cu-Kα rays.

In the case where the sample having a high orientation is measured, the position of a peak may be shifted or the peak intensity ratio may be varied depending on the state of sample filling. A sample with such a highly orientation is measured using a capillary. Specifically, the sample is inserted into a capillary, the capillary is mounted on a rotary sample stand, and subjected to measurement. This measurement method can decrease the influence of orientation.

The active material included in the battery as an electrode material may be measured as follows.

First, lithium ions are completely released from the active material. For example, in the case where the active material is used in the negative electrode, the battery is fully discharged. As a result, the crystal condition of the active material can be observed. However, residual lithium ions may be present even in a discharged state. Next, in a glove box filled with argon, the battery is disintegrated, and the electrode is taken out. The electrode taken out is washed with a suitable solvent. For example, ethyl methyl carbonate may be used as a cleaning solvent. The washed electrode is cut to the size almost equal to the area of the holder of the powder X-ray diffractometer, and used as the sample for measurement. The sample is affixed directly to the glass holder, and measured. At this time, the position of the peak originated from the electrode substrate such as metal foil is measured in advance. In addition, the peaks of other components such as a conductive agent and a binder are also measured in advance. In the case where the peaks of the substrate and the active material overlap each other, it is preferred that a layer containing the active material (e.g., an active material layer to be described below) is separated from the substrate, and subjected to measurement. This is a process for separating the overlapping peaks when the peak intensity is quantitatively measured. For example, the active material layer can be separated from the electrode substrate by irradiating the electrode substrate with an ultrasonic wave in a solvent.

The active material layer is sealed into the capillary, mounted on the rotary sample table, and measured. As a result of this process, the XRD pattern of the active material is obtained with the influence of the orientation reduced.

The XRD pattern thus obtained is analyzed by the Rietveld method. In the Rietveld method, the diffraction pattern is calculated from the model of the crystal structure which has been predicted in advance. The parameters of the crystal structure (e.g., lattice constant, atomic coordinate, and occupancy) can be precisely analyzed by fitting all the calculated values to the actual measured values. As a result, the characteristics of the crystal structure of the compound included in the active material to be measured can be examined. Further, the above-described powder X-ray measurement enables a multi-phases coexisting state between the composite oxide $Ti_2(Nb_{1-x}Ta_x)_2O_9$ having an orthorhombic structure and a compound having another crystal structure, such as $H(Nb_{1-x}Ta_x)TiO_5$, $Ti(Nb_{1-x}Ta_x)_2O_7$ or $TiO_2$ to be examined.

<Measurement of Average Valence of Nb and/or Ta>

The electrode recovered from the battery in the above manner may be subjected to various chemical analyses. For example, the average valence of Nb and/or Ta of an active material in the electrode layer may be examined using X-ray absorption fine structure (XAFS) spectroscopy in order to qualitatively determine whether niobium (Nb) and/or tantalum (Ta) in the crystal structure are reduced.

On the other hand, in order to quantitatively determine the average valence of niobium (Nb) and/or tantalum (Ta), the following method may be used to examine it. First, the active material in the state where Li has been fully released is dried in vacuum at 140° C. for 24 hours, and then the total weight is measured in a dry atmosphere. The resultant active material is dissolved in an acid, and constituent elements are quantitatively analyzed by inductively coupled plasma atomic emission spectroscopy (ICP analysis). Assuming that all the constituent elements obtained by the quantitative analysis have ideal valences (titanium has tetravalent, niobium has pentavalent, and tantalum has pentavalent), or a proportion of Ti and Nb and/or Ta which has been reduced is 0, the amount of oxygen when all the obtained constituent elements are present in oxides is calculated. When the total of the weight corresponding to the calculated amount of oxygen and the weight corresponding to the amount of the constituent elements obtained by analysis is higher than that the actual measured weight, this means that the constituent elements are reduced in an amount of difference between both the weights. These analyses allow for quantitative measurement of the valence of Nb and/or Ta.

The reduced amount of niobium and/or tantalum can be measured in accordance with the above-described method. However, for a sample which has been subjected to a charge-and-discharge cycle in a battery, a sample taken from an electrode which is sufficiently discharged (namely, Li is sufficiently released) as described above is used and inductively coupled plasma atomic emission spectroscopy is used to determine whether there is no residual Li in the structure of the sample or not in advance. In the case of the presence of residual Li, it is necessary to correct the reduced amount of Nb and/or Ta. Specifically, the average valence of Nb and/or Ta before the charge-and-discharge process can be determined by assuming that Nb and/or Ta is reduced by the Li remaining in the crystal and adding the valence corresponding to the amount of Li which is calculated from a value measured by ICP analysis to the average valence of Nb and/or Ta. The average valence of less than 5 means that Nb and/or Ta contained in the active material are reduced, meanwhile, the average valence of 5 means that Nb and/or Ta contained in the active material are in an ideal state.

In the case where carbon or the like is deposited on the surface of the active material particles, it is necessary to calcine the active material in air at 900° C. in order to reduce the carbon content and calculate the carbon-deposited amount from a weight difference between before and after the calcination process.

In the case where the active material particles include various kinds of active materials, the particles are examined using transmission electron microscopy (TEM) in combination with electron energy-loss spectroscopy (EELS) (TEM-EELS). Electron diffraction is performed on target active material particles, and the phases thereof are identified from respective crystal structures. A target $Ti_2Nb_2O_9$ is measured by EELS so that the valence of Nb and/or Ta can be determined.

<Method of Determining Composition of Active Material>

The composition of the active material can be determined using, for example, inductively-coupled plasma emission spectrometry.

According to the first embodiment, there is provided an active material. The active material includes a composite oxide having an orthorhombic structure which is represented by the general formula of $Ti_2(Nb_{1-x}Ta_x)_2O_9$ ($0 \leq x \leq 1$) and has an average valence of Nb and/or Ta of 4.95 or more. Thus, the active material according to the first embodiment can achieve a nonaqueous electrolyte battery which can exhibit excellent rapid charge-and-discharge performance and high energy density.

Second Embodiment

According to a second embodiment, there is provided a nonaqueous electrolyte battery containing the active material according to the first embodiment. The nonaqueous electrolyte battery includes a positive electrode, a negative electrode, and a nonaqueous electrolyte. The active material according to the first embodiment can be used in the negative electrode and/or the positive electrode.

The nonaqueous electrolyte battery according to the second embodiment may further include a separator provided between the positive electrode and the negative electrode. The positive electrode, the negative electrode and the separator can form electrode group. The nonaqueous electrolyte can be held in the electrode group.

The nonaqueous electrolyte battery according to the second embodiment may include an exterior member accommodating the electrode group and the nonaqueous electrolyte.

The nonaqueous electrolyte battery according to the second embodiment may further include a positive electrode terminal electrically connected to the positive electrode and a negative electrode terminal electrically connected to the negative electrode. At least a part of the positive electrode terminal and at least a part of the negative electrode terminal are extended out from the exterior member.

Hereinafter, a negative electrode, a positive electrode, a nonaqueous electrolyte, a separator, an exterior member, a positive electrode terminal, and a negative electrode terminal, which may be included in a nonaqueous electrolyte battery using the active material according to the first embodiment in the negative electrode will be described in detail.

(1) Negative Electrode

The negative electrode includes a negative electrode current collector and a negative electrode layer (negative-electrode-active-material-containing layer) formed on one surface or both surfaces of the negative electrode current collector.

The negative electrode layer may include a negative electrode active material, a conductive agent, and a binder.

As the negative electrode active material, the active material to according to the first embodiment is used. As the negative electrode active material, the active material according to the first embodiment may be used singly or in mixture of other active materials. Examples of other negative electrode active materials include lithium titanate $Li_2Ti_3O_7$ having a ramsdellite structure and lithium titanate $Li_4Ti_5O_{12}$ having a spinel structure.

The conductive agent is added to improve the current collection performance and suppress the contact resistance between the active material and the current collector. Examples of the conductive agent include carbonaceous substances such as acetylene black, carbon black, and graphite.

The binder is added to fill gaps in the dispersed negative electrode active material and bind the active material to the current collector. Examples of the binder include polytetrafluoroethylene (PTFE), polyvinylidene fluoride (PVdF), fluorine-based rubber, and styrene butadiene rubber.

Preferably, blending ratios of the active material, the conductive agent, and the binder in the negative electrode layer are from 68% by mass to 96% by mass, from 2% by mass to 30% by mass, and from 2% by mass to 30% by mass, respectively. The amount of the conductive agent is set to 2% by mass or more, whereby the current collection performance of the negative electrode layer can be improved. The amount of the binder is set to 2% by mass or more, whereby the binding property of the negative electrode layer and the current collector becomes sufficient. Finally, excellent cycle characteristics can be expected. On the other hand, the amounts of the conductive agent and the binder are preferably set to 28% by mass or less from the viewpoint of high capacity performance.

As a material for the negative electrode current collector, a material which is electrochemically stable at the lithium absorption and release potential of the negative electrode active material is used. The negative electrode current collector is preferably made of copper, nickel, stainless steel or aluminum, or an aluminum alloy containing at least one element selected from Mg, Ti, Zn, Mn, Fe, Cu, and Si. The thickness of the negative electrode current collector is preferably from 5 µm to 20 µm. The negative electrode current collector having such a thickness can balance the strength and reduction in weight of the negative electrode.

The negative electrode is prepared, for example, by suspending the negative electrode active material, the binder, and the conductive agent in a generally used solvent to prepare a slurry, coating the current collector with the slurry, drying the coated film to form a negative electrode layer, and pressing the layer.

Alternatively, the negative electrode may be prepared by forming the negative electrode active material, binder, and conductive agent into pellets to form a negative electrode layer, and disposing the negative electrode layer on the current collector.

(2) Positive Electrode

The positive electrode may include a positive electrode current collector and a positive electrode layer (positive-electrode-active-material-containing layer) formed on one surface or both surfaces of the positive electrode current collector.

The positive electrode current collector is preferably an aluminum foil or an aluminum alloy foil containing at least one element selected from Mg, Ti, Zn, Ni, Cr, Mn, Fe, Cu, and Si.

The thickness of the aluminum foil or aluminum alloy foil is preferably 5 µm or more and 20 µm or less, more preferably 15 µm or less. The purity of the aluminum foil is preferably 99% by mass or more. The content of the transition metal such as iron, copper, nickel, or chromium contained in the aluminum foil or aluminum alloy foil is preferably 1% by mass or less.

The positive electrode layer may contain the positive electrode active material and the binder.

Examples of the positive electrode active material include oxides and sulfides. Examples thereof include manganese dioxide ($MnO_2$), iron oxide, copper oxide, and nickel oxide, each of which absorbs lithium, and lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium-manganese-nickel composite oxide having a spinel structure ($Li_xMn_{2-y}Ni_yO_4$), lithium-containing phosphate having an olivine structure ($Li_xFePO_4$, $Li_xFe_{1-y}Mn_yPO_4$, $Li_xCoPO_4$, etc.), iron sulfate ($Fe_2(SO_4)_3$), vanadium oxide (e.g., $V_2O_5$), and lithium nickel cobalt manganese composite oxide. In the above formula, $0<x\leq1$ and $0\leq y\leq1$. As the positive electrode active material, one of these compounds may be used or combination with plural kinds of these compound may be used.

Examples of a preferred active material include lithium manganese composite oxide (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, each of which has a high positive electrode voltage. In the above formula, $0<x\leq1$ and $0\leq y\leq1$.

Particularly, in the case where a nonaqueous electrolyte containing ordinary temperature molten salt is used, it is preferable to use at least one selected from lithium iron phosphate $Li_xVPO_4F$ ($0\leq x\leq1$), lithium manganese composite oxide, lithium nickel composite oxide, and lithium nickel cobalt composite oxide from the viewpoint of cycle life. This is because the reactivity of the positive electrode active material with ordinary temperature molten salt is decreased.

The primary particle size of the positive electrode active material is preferably from 100 nm to 1 µm. In the case of the positive electrode active material having a primary particle size of 100 nm or more, the handling in the industrial production is made easy. The positive electrode active material having a primary particle size of 1 µm or less allows diffusion of lithium ions in solid to be smoothly progressed.

The specific surface area of the positive electrode active material is preferably from 0.1 $m^2/g$ to 10 $m^2/g$. In the case of the positive electrode active material having a specific surface area of 0.1 $m^2/g$ or more, the absorption and release site of lithium ions can be sufficiently ensured. In the case of the positive electrode active material having a specific surface area of 10 $m^2/g$ or less, the handling in the industrial production is made easy and good charge and discharge cycle performance can be ensured.

The binder is added to bind the positive electrode active material to the current collector. Examples of the binder include polytetrafluoroethylene (PTFE), polyvinylidene fluoride (PVdF), and fluorine-based rubber.

In order to improve the current collection performance and suppress the contact resistance with the current collector, the conductive agent may be added to the positive electrode layer, if necessary. Examples of the conductive agent include carbonaceous substances such as acetylene black, carbon black, and graphite.

The blending ratios of the positive electrode active material and the binder in the positive electrode layer are preferably from 80% by mass to 98% by mass and from 2% by mass to 20% by mass, respectively. When the amount of the binder is 2% by mass or more, sufficient electrode strength is obtained. When the amount of the binder is 20% by mass or less, the amount of the insulating material of the electrode can be reduced, leading to reduced internal resistance.

When the conductive agent is added, the positive electrode active material, binder, and conductive agent are blended at the ratio from 77% by mass to 95% by mass, from 2% by mass to 20% by mass, and from 3% by mass to 15% by mass, respectively. When the amount of the conductive agent is 3% by mass or more, the above effect can be sufficiently exerted. Further, when the amount of the conductive agent is 15% by mass or less, it is possible reduce the decomposition of the nonaqueous electrolyte on the surface of the positive electrode conductive agent during storage at high temperatures.

The positive electrode may be prepared by a method including suspending the positive active material, the binder, and the conductive agent that is added if necessary, into an appropriate solvent to prepare a slurry, applying the slurry to the positive electrode current collector, drying a coated film to form a positive electrode layer, and pressing it.

Alternatively, the positive electrode may be produced by forming the positive electrode active material, the binder, and the conductive agent that is added if necessary, into pellets to form a positive electrode layer, and disposing the positive electrode layer on the positive electrode current collector.

(3) Nonaqueous Electrolyte

The nonaqueous electrolyte may be, for example, a liquid nonaqueous electrolyte prepared by dissolving an electrolyte in an organic solvent or a gel-like nonaqueous electrolyte which is a composite of a liquid electrolyte and a polymer material.

The liquid nonaqueous electrolyte is preferably one which is prepared by dissolving an electrolyte in an organic solvent at a concentration of 0.5 to 2.5 mol/L.

Examples of the electrolyte include lithium salts of lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoromethanesulfonate ($LiCF_3SO_3$), bistrifluoromethylsulfonylimidolithium ($LiN(CF_3SO_2)_2$), and lithium bis(fluorosulfonyl)imide (FSI), and mixtures thereof. Preferably, the electrolyte is hardly oxidized even at a high potential. $LiPF_6$ is the most preferred.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL); acetonitrile (AN); and sulfolane (SL). These organic solvents may be used alone or as a mixed solvent.

Examples of the polymer material include polyvinylidene fluoride (PVdF), polyacrylonitrile (PAN), and polyethylene oxide (PEO).

Alternatively, an ordinary temperature molten salt containing lithium ions (ionic melt), polymeric solid electrolyte, inorganic solid electrolyte and the like may be used as the nonaqueous electrolyte.

The ordinary temperature molten salt (ionic melt) means compounds which can exist in a liquid state at normal temperature (15 to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. Generally, the melting point of the ordinary temperature molten salt to be used for the nonaqueous electrolyte battery is 25° C. or less. Further, in general, the organic cation has a quaternary ammonium skeleton.

The polymeric solid electrolyte is prepared by dissolving an electrolyte in a polymer material to obtain mixture and solidifying the mixture. The inorganic solid electrolyte is a solid material having lithium ion-conductivity.

(4) Separator

The separator may be formed of a porous film containing a material such as polyethylene, polypropylene, cellulose or polyvinylidene fluoride (PVdF), or a nonwoven fabric of a synthetic resin. Particularly, a porous film formed of polyethylene or polypropylene melts at a constant temperature and can block electric current, and thus it is preferred from the viewpoint of improvement in safety.

(5) Exterior Member

As the exterior member, for example, a container formed of a laminate film having a thickness of 0.5 mm or less or a container formed of metal having a thickness of 1 mm or less may be used. The thickness of the laminate film is more preferably 0.2 mm or less. The thickness of the metal container is preferably 0.5 mm or less, more preferably 0.2 mm or less.

Examples of a shape of the exterior member include a flat type (thin type), a rectangular type, a cylindrical type, a coin type, and a button type. Depending on the battery size, the exterior member may be an exterior member for a small battery which is mounted to a portable electronic device or an exterior member for a large battery which is mounted to a two- or four-wheeled vehicle.

As the laminate film, a multilayer film in which a metal layer is sandwiched between resin layers may be used. The metal layer is preferably an aluminum foil or an aluminum alloy foil in order to reduce the weight. As the resin layer, for example, a polymer material such as polypropylene (PP), polyethylene (PE), nylon or polyethylene terephthalate (PET) may be used. The laminate film can be molded into the shape of the exterior member by sealing by thermal fusion bonding.

The metal container can be formed, for example, from aluminum or an aluminum alloy. The aluminum alloy is preferably an alloy containing an element such as magnesium, zinc or silicon. In the case where a transition metal such as iron, copper, nickel or chromium is contained in the alloy, the content of the transition metal is preferably 1% by mass or less.

(6) Positive Electrode Terminal and Negative Electrode Terminal

The negative electrode terminal can be formed from a material which is electrically stable in Li absorption and release potential of the negative electrode active material described above and has conductivity. Specific examples thereof include copper, nickel, stainless steel, and aluminum. In order to reduce the contact resistance, the same material as that of the negative electrode current collector is preferred.

The positive electrode terminal can be formed of a material which has electric stability at a potential in a range of from 3 V to 5 V to a lithium ion metal, and conductivity. Specific examples thereof include an aluminum alloy containing an element such as Mg, Ti, Zn, Mn, Fe, Cu or Si and aluminum. In order to reduce the contact resistance, it is preferable to use a material similar to that of the positive electrode current collector.

Subsequently, a nonaqueous electrolyte battery of one example according to the second embodiment will be described in detail with reference to FIGS. 2 and 3.

FIG. 2 is a schematic sectional view of an example of a nonaqueous electrolyte battery according to the second embodiment. FIG. 3 is an enlarged view of the portion A in FIG. 2.

A flat-shaped nonaqueous electrolyte battery 10 shown in FIG. 2 includes a flat-shaped coiled electrode group 1 and a bag-shaped exterior member 2 which houses the flat-shaped coiled electrode group 1. The bag-shaped exterior member 2 is formed of a laminate film in which a metal layer is sandwiched between two resin films.

The flat-shaped coiled electrode group 1 is formed by spirally winding a laminate obtained by stacking a negative electrode 3, a separator 4, a positive electrode 5, and a separator 4 in this order from the outermost member to obtain a coiled product and press-molding the coiled product. The negative electrode 3 in the outermost layer has a configuration in which a negative electrode layer 3b is formed on one side of the internal surface of a negative electrode current collector 3a as shown in FIG. 3. The other portion of the negative electrode 3 has a configuration in which the negative electrode layer 3b is formed on both surfaces of the negative electrode current collector 3a. The positive electrode 5 has a configuration in which a positive electrode layer 5b is formed on both surfaces of a positive electrode current collector 5a.

In the vicinity of the outer peripheral end of the coiled electrode group 1, a negative electrode terminal 6 is connected to the negative electrode current collector 3a of the negative electrode 3 in the outermost layer, and a positive electrode terminal 7 is connected to the positive electrode current collector 5a of the inner side positive electrode 5. The negative electrode terminal 6 and the positive electrode terminal 7 are extended to the outside from an opening part of the bag-shaped exterior member 2. For example, liquid nonaqueous electrolyte is filled from the opening part of the bag-shaped exterior member 2. The opening part of the bag-shaped exterior member 2 is subjected to heat-sealing with the negative electrode terminal 6 and the positive electrode terminal 7 interposed therein, and thereby completely sealing the coiled electrode group 1 and the liquid nonaqueous electrolyte.

Figure 5:
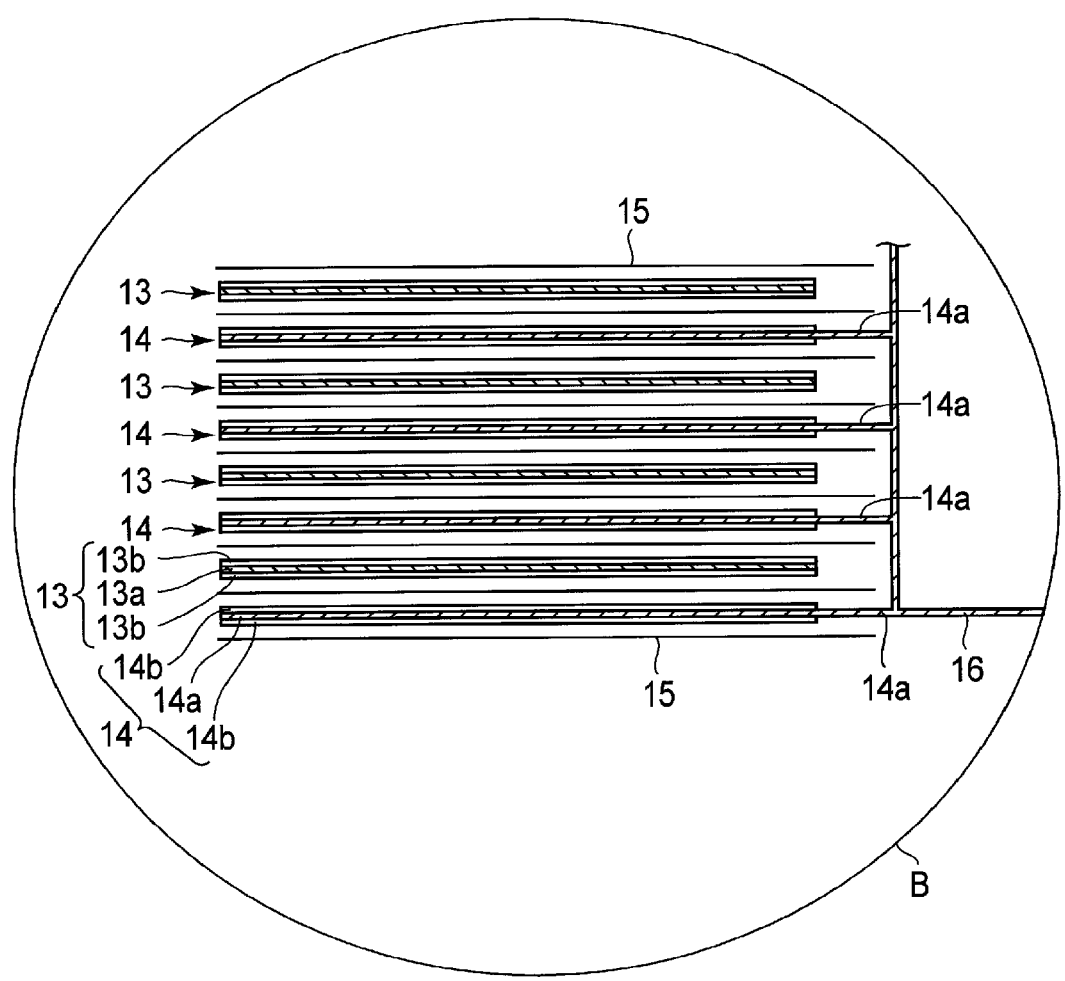
FIG. 5 is an enlarged sectional view of the portion B in FIG. 4.

The nonaqueous electrolyte battery according to the second embodiment is not necessarily limited to the above-mentioned configuration shown in FIGS. 2 and 3, but it may have a configuration shown in, for example, FIGS. 4 and 5.

FIG. 4 is a schematic sectional view of another example of a nonaqueous electrolyte battery according to the second embodiment. FIG. 5 is an enlarged sectional view of the part B in FIG. 4.

A flat type nonaqueous electrolyte battery 10 shown in FIGS. 4 and 5 includes a stacked electrode group 11, and an exterior member 12 housing the laminated electrode group 11. The exterior member 12 is made of a laminate film including two resin films and a metal layer sandwiched between the resin films.

As shown in FIG. 5, the laminated electrode group 11 has a structure in which a positive electrode 13 and a negative electrode 14 are alternately laminated with a separator 15 sandwiched therebetween. A plurality of the positive electrodes 13 exist, and each of them includes a current collector 13a and a positive electrode active material containing layer 13b supported by both surfaces of the current collector 13a. A plurality of the negative electrodes 14 exist, and each of them includes a current collector 14a and negative electrode active material containing layer 14b supported by both surfaces of the current collector 14a. One side of the current collector 14a of each of the negative electrodes 14 protrudes from the positive electrode 13. The protruding current collectors 14a are electrically connected to a belt-like negative electrode terminal 16. The tip end of the belt-like negative electrode terminal 16 is drawn out to the outside from the exterior member 12. Although not shown, in the current collector 13a of each of the positive electrode 13, a side, which is positioned opposite to the protruding side of the current collectors 14a, protrudes. The current collectors 13a protruding from the negative electrodes 14 are electrically connected to a belt-like positive electrode terminal 17. The tip end of the belt-like positive electrode terminal 17 is located at the opposite side to the negative electrode terminal 16, and drawn out to the outside from the side of the exterior member 12.

The nonaqueous electrolyte battery according to the second embodiment includes the active material according to the first embodiment, and therefore, can exhibit excellent rapid charge-and-discharge performance and high energy density.

Third Embodiment

According to a third embodiment, there is provided a battery pack. The battery pack includes the nonaqueous electrolyte battery according to the second embodiment.

The battery pack according to the third embodiment can include a plurality of the nonaqueous electrolyte batteries. The nonaqueous electrolyte batteries can be electrically connected to each other in series or in parallel. Alternatively, the nonaqueous electrolyte batteries can be electrically connected to each other in the combination of the series connection and the parallel connection.

Next, an example of the battery pack according to the third embodiment will be described with reference to FIGS. 6 and 7.

Figure 6:
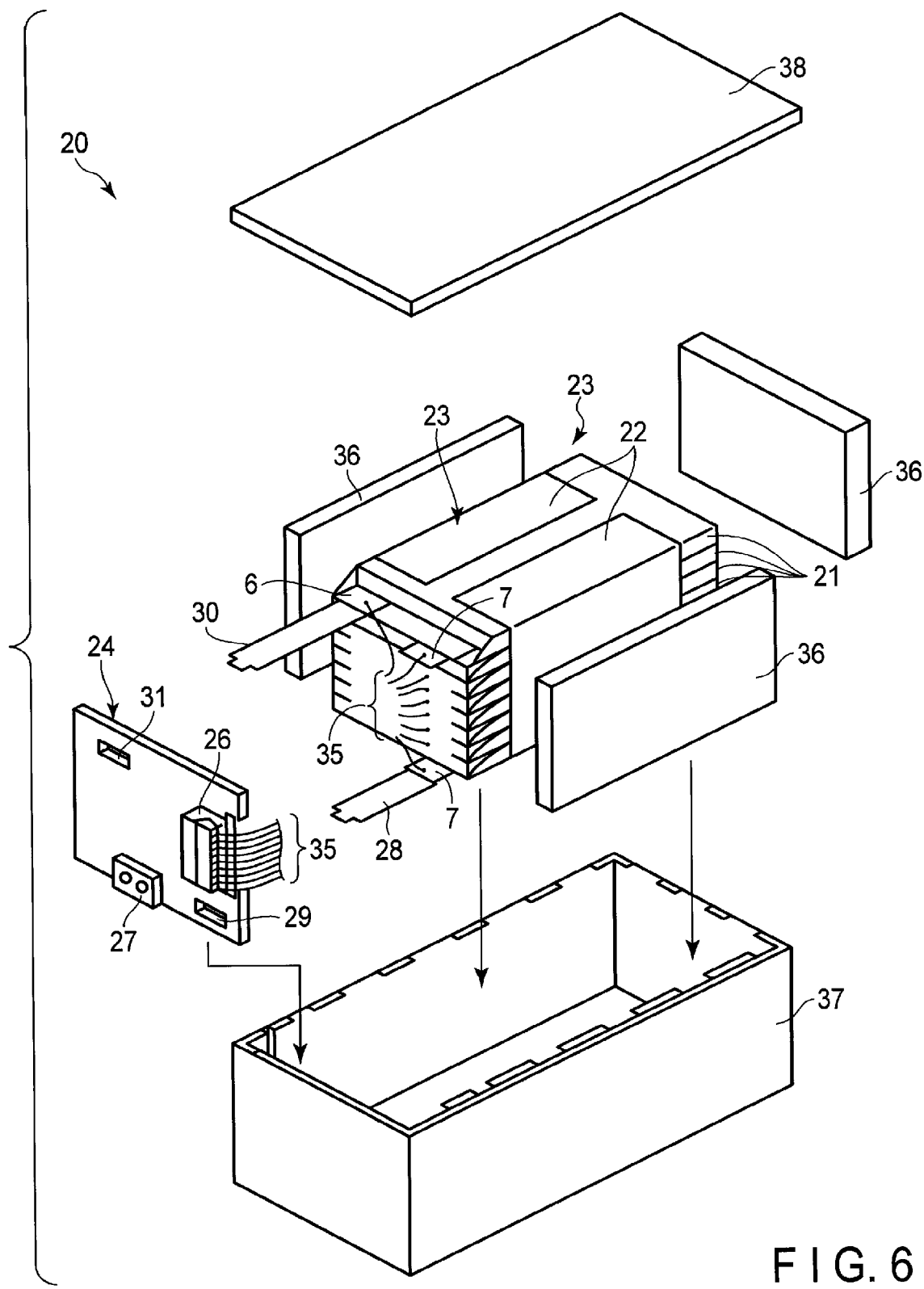
FIG. 6 is an exploded perspective view of an example of a battery pack according to a third embodiment.

FIG. 6 is a schematic exploded perspective view of an example of a the battery pack according to the third embodiment. FIG. 7 is a block diagram showing an electric circuit of the battery pack shown in FIG. 6.

Figure 7:
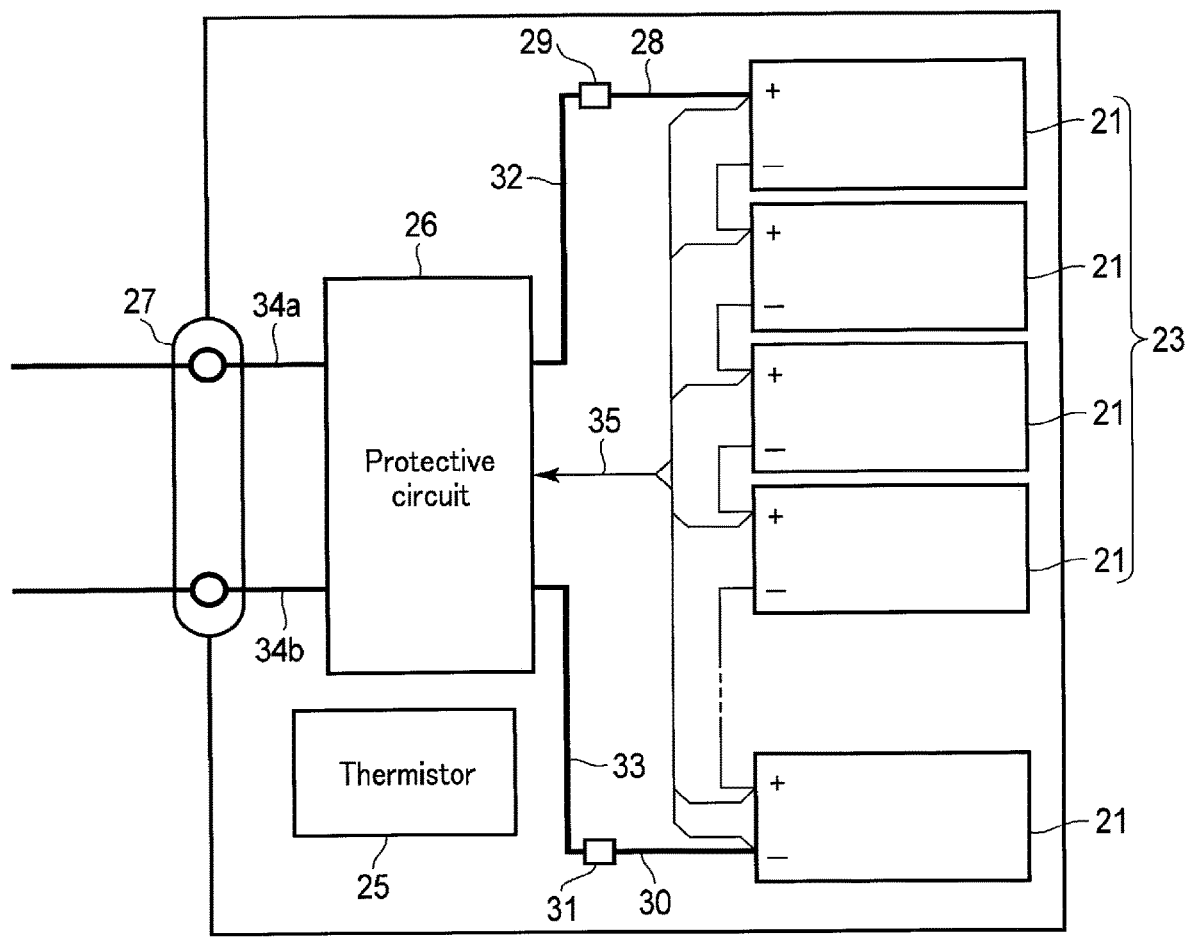
FIG. 7 is a block diagram showing the electric circuit of the battery pack of FIG. 6.

The battery pack 20 shown in FIGS. 6 and 7 includes a plurality of unit cells 21. The unit cell 21 is an example of the flat-shaped nonaqueous electrolyte battery according to the second embodiment which has been described with reference to FIGS. 2 and 3.

The plural unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 7.

A printed wiring board 24 is arranged opposed to the side plane where the negative electrode terminal 6 and the positive electrode terminal 7 of the unit cell 21 are extended. A thermistor 25, a protective circuit 26, and an energizing terminal 27 to an external device are mounted on the printed wiring board 24 as shown in FIG. 7. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case of the over-charge, over-discharge, or over-current of the unit cells 21. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 6 and 7, wirers 35 for voltage detection are connected to each of the unit cells 21. Detection signals are sent to the protective circuit 26 through the wirers 35.

Protective sheets 36 included of rubber or resin are arranged on each of three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tube, and thermally shrinking the heat-shrinkable tube.

In FIGS. 6 and 7, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics in large-current characteristics are desired. Specific examples of these applications include application as a power source of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a power source mounted to a vehicle.

The battery pack according to the third embodiment includes the nonaqueous electrolyte battery according to the second embodiment, and therefore, can exhibit excellent rapid charge-and-discharge performance and high energy density.

EXAMPLES

Hereinafter, the above embodiments will be described more in detail based on examples.

Example 1-1 to 1-4, Comparative example 1, Example 2-1 to 2-3, Example 3-1 to 3-6, Example 4, Comparative example 2, and Comparative example 3 were performed in order to synthesize an active material having the target composition shown in Table 1 below. The kinds and amounts (mole ratios) of starting materials in the examples and comparative examples are written in Table 1.

The identification of the crystal phase of the active material and estimation of crystal structure of the active material were performed by the powder X-ray diffractometry using Cu-Kα rays. Further, the composition of the precursor and the composition of the product were determined by the ICP method as described above.

TABLE 1

| | | Starting Material | | | |
|---|---|---|---|---|---|
| | Target composition | Ti-Source/ Amount | Nb-Source/ Amount | Ta-Source/ Amount | K-Source/ Amount |
| Example 1-1 | $Ti_2Nb_2O_9$ (x = 0) | $TiO_2$/ 1.0 | $Nb_2O_5$/ 0.5 | — | $K_2CO_3$/ 0.5 |
| Example 1-2 | $Ti_2Nb_2O_9$ (x = 0) | $TiO_2$/ 1.0 | $Nb_2O_5$/ 0.5 | — | $K_2CO_3$/ 0.5 |
| Example 1-3 | $Ti_2Nb_2O_9$ (x = 0) | $TiO_2$/ 1.0 | $Nb_2O_5$/ 0.5 | — | $K_2CO_3$/ 0.5 |
| Example 1-4 | $Ti_2Nb_2O_9$ (x = 0) | $TiO_2$/ 1.0 | $Nb_2O_5$/ 0.5 | — | $K_2CO_3$/ 0.5 |
| Comparative Example 1 | $Ti_2Nb_2O_9$ (x = 0) | $TiO_2$/ 1.0 | $Nb_2O_5$/ 0.5 | — | $K_2CO_3$/ 0.5 |
| Example 2-1 | $Ti_2Nb_2O_9$ (x = 0) | $TiO_2$/ 1.0 | $Nb_2O_5$/ 0.5 | — | $K_2CO_3$/ 0.5 |
| Example 2-2 | $Ti_2Nb_2O_9$ (x = 0) | $TiO_2$/ 1.0 | $Nb_2O_5$/ 0.5 | — | $K_2CO_3$/ 0.5 |
| Example 2-3 | $Ti_2Nb_2O_9$ (x = 0) | $TiO_2$/ 1.0 | $Nb_2O_5$/ 0.5 | — | $K_2CO_3$/ 0.5 |
| Example 3-1 | $Ti_2Nb_{1.98}Ta_{0.02}O_9$ (x = 0.01) | $TiO_2$/ 1.0 | $Nb_2O_5$/ 0.495 | $Ta_2O_5$/ 0.01 | $K_2CO_3$/ 0.5 |
| Example 3-2 | $Ti_2Nb_{1.90}Ta_{0.10}O_9$ (x = 0.05) | $TiO_2$/ 1.0 | $Nb_2O_5$/ 0.475 | $Ta_2O_5$/ 0.025 | $K_2CO_3$/ 0.5 |
| Example 3-3 | $Ti_2Nb_{1.80}Ta_{0.20}O_9$ (x = 0.1) | $TiO_2$/ 1.0 | $Nb_2O_5$/ 0.450 | $Ta_2O_5$/ 0.05 | $K_2CO_3$/ 0.5 |

TABLE 1-continued

| | Target composition | Starting Material | | | |
|---|---|---|---|---|---|
| | | Ti-Source/ Amount | Nb-Source/ Amount | Ta-Source/ Amount | K-Source/ Amount |
| Example 3-4 | $Ti_2Nb_{1.50}Ta_{0.50}O_9$ (x = 0.25) | $TiO_2$/ 1.0 | $Nb_2O_5$/ 0.375 | $Ta_2O_5$/ 0.125 | $K_2CO_3$/ 0.5 |
| Example 3-5 | $Ti_2Nb_{1.00}Ta_{1.00}O_9$ (x = 0.5) | $TiO_2$/ 1.0 | $Nb_2O_5$/ 0.250 | $Ta_2O_5$/ 0.250 | $K_2CO_3$/ 0.5 |
| Example 3-6 | $Ti_2Ta_2O_9$ (x = 1.0) | $TiO_2$/ 1.0 | — | $Ta_2O_5$/ 0.5 | $K_2CO_3$/ 0.5 |
| Example 4 | $Ti_2Nb_2O_9$ (x = 0, y = 0) | $TiO_2$/ 1.0 | $Nb_2O_5$/ 0.5 | — | $K_2CO_3$/ 0.5 |
| Comparative Example 2 | $Ti_2Nb_2O_9$ (x = 0) | $TiO_2$/ 1.0 | $Nb_2O_5$/ 0.5 | — | $K_2CO_3$/ 0.5 |
| Comparative Example 3 | $Ti_2Nb_2O_9$ (x = 0) | $TiO_2$/ 1.0 | $Nb_2O_5$/ 0.5 | — | $K_2CO_3$/ 0.5 |

Example 1-1

In Example 1-1, an active material of Example 1 was synthesized by the following procedure.

[Synthesis of Precursor]

At first, as starting materials, niobium pentoxide ($Nb_2O_5$) powder, titanium dioxide ($TiO_2$) powder, and potassium carbonate ($K_2CO_3$) powder, each of which is commercially available oxide reagents, were provided. These starting materials were mixed at a mole ratio of $Nb_2O_5$:$TiO_2$:$K_2CO_3$ of 0.5:1.0:0.5 to obtain a mixed powder.

Then, the mixed powder was calcined under air atmosphere at 650° C. for 1 hour. Next, the resultant product was subjected to a further calcination process at 800° C. for 12 hours.

After that, the calcined powder was mixed again. The resultant powder was pressed into a pellet having a size of 12 mm in diameter and 3 mm in thickness as a molded body.

The molded body was placed in a crucible and sintered under air atmosphere at 1150° C. for 12 hours to obtain a sintered body.

Then, the sintered body was divided into two. One of the sintered body was annealed under air atmosphere at 800° C. for 6 hours. The calcined body after being annealed was slowly cooled in an electric furnace chamber to obtain a precursor powder.

A part of the precursor powder was collected and subjected to ICP analysis as described above. The results showed that the obtained precursor had the composition of $KNbTiO_5$. As for the precursor thus obtained, the average valences of Nb and Ti were confirmed by the above procedure. In the precursor $KNbTiO_5$ of Example 1, the average valence of niobium Nb was 4.98, and the average valence of titanium Ti was 4.01.

[Proton Exchange of Precursor]

Subsequently, the obtained precursor $KNbTiO_5$ was subject to proton-exchange in the following procedure.

First, the $KNbTiO_5$ sintered body, which is the thus obtained precursor, was coarsely ground in a mortar. Next, 5 g of the coarsely ground powder was placed in a zirconia pot having an internal volume of 100 cm³, and then 10 mm-diameter zirconia balls were added until the total volume of the balls became one-third of the volume of the pot. The powder was ground by rotating the pot at 800 rpm for 2 hours. The ground powder had an average particle size of about 5 µm.

After that, the ground powder $KNbTiO_5$ was added to a 1 M hydrochloric acid solution and the mixture was stirred at 25° C. for 72 hours. In this case, 1M hydrochloric acid was replaced with a new one every 24 hours. As a result, potassium ions in the $KNbTiO_5$ powder were exchanged with protons, and a proton exchanged $HNbTiO_5$ powder was obtained.

Then, the proton-exchanged powder thus obtained was washed with pure water until the pH of the cleaning solution reached 7.

After that, the proton exchanged powder was dehydrated by heating for 2 hours. In order to obtain an accurate heat history, a sample of the proton-exchanged powder was placed in an electric furnace which has preheated at a predetermined temperature of 260° C. The sample was quickly taken out from the furnace after being heated, and quenched in air.

The heated sample was dried in vacuum at 80° C. for 12 hours. In this way, the active material of Example 1-1 was obtained.

Examples 1-2 to 1-4, and Comparative Example 1

In Example 1-2 to 1-4 and Comparative example 1, active materials of Example 1-2 to 1-4 and Comparative Example 1 were produced in the same manner as Example 1-1 except that each proton-exchanged powder was heated (heating for dehydration) at 350° C., 500° C., 600° C., and 800° C., respectively.

The sintering conditions and annealing conditions for precursor synthesis, the composition of precursors, the acid treatment conditions, and the condition of the heating for dehydration as for Example 1-2 to 1-4 and Comparative example 1 are the same as those of Example 1, but are shown once again in Table 2 below.

Examples 2-1 to 2-3

In Example 2-1 to 2-3, active materials of Example 2-1 to 2-3 were produced in the same manner as Example 1-2 except that annealing temperatures for precursor synthesis were set to 1000° C., 800° C., 400° C., and 600° C., respectively.

The sintering conditions and annealing conditions for precursor synthesis, the composition of precursors, the acid treatment conditions, and the condition of the heating for dehydration as for Example 2-1 to 2-3 are shown in Table 2 below.

Examples 3-1 to 3-6

In Example 3-1 to 3-6, active materials of Example 3-1 to 3-6 were produced in the same manner as Example 1-2 except that tantalum pentoxide $Ti_2O_5$, which is a commercially available oxide reagent, was further provided as a starting material, and the starting materials were mixed at the mole ratio of $Nb_2O_5:Ta_2O_5:TiO_2:K_2CO_3$ shown in Table 1 above to obtain a mixed powder.

The sintering conditions and annealing conditions for precursor synthesis, the composition of precursors, the acid treatment conditions, and the condition of the heating for dehydration as for Example 3-1 to 3-6 are shown in Table 2 below.

Example 4

In Example 4, an active material of Example 4 was produced in the same manner as Example 1-2 except that a 4 M nitric acid solution was used in place of a 1 M hydrochloric acid solution in the proton exchange treatment of the precursor.

The sintering condition and annealing conditions for the precursor synthesis, the composition of the precursor, the acid treatment condition, and the condition of the heating for dehydration as for Example 4 are shown in Table 2 below.

Comparative Example 2

In Comparative example 2, an active material of Comparative example 2 was produced in the same manner as Example 1-2 except for the method of synthesizing a precursor.

In Comparative example 2, the sintered body which was not annealed in Example 1-1 was sintering at 1150° C. more for 12 hours. The sintered body thus obtained was ground into powder and the powder was used as the precursor powder of Comparative example 2. Hence, the annealing treatment was not performed in Comparative example 2.

The sintering condition for the precursor synthesis, the composition of the precursor, the acid treatment condition, and the condition of the heating for dehydration as for Comparative example 2 are shown in Table 2 below.

Comparative Example 3

In Comparative example 3, an active material of Comparative example 3 was produced in the same manner as Example 4 except that a sintered body was further sintered at 1150° C. more for 12 hours instead annealing the sintered body. In other words, the active material was produced in the same manner as the method described in Mingmin Fang, Chy Hyung Kim, and Thomas E. Mallouk, "Dielectric Properties of the Lamellar Niobates and Titanoniobates AM2Nb3O10 and ATiNbO5 (A=H, K, M=Ca, Pb), and Their Condensation Products Ca4Nb6O19 and Ti2Nb2O9", Chem. Mater., 1999, 11 (6), pp 1519-1525.

The sintering condition for the precursor synthesis, the composition of the precursor, the acid treatment condition, and the condition of the heating for dehydration as for Comparative example 3 are shown in Table 2 below.

TABLE 2

| | Condition of Sintering for Precursor Synthesis | Annealing Condition | Composition of Precursor | Condition of Acid Treatment | Conditions of Heating for Dehydration |
|---|---|---|---|---|---|
| Example 1-1 | 1150° C. 12 h | 600° C. 6 h | $KNbTiO_5$ | 1M HCl 72 h | 260° C. 2 h |
| Example 1-2 | 1150° C. 12 h | 600° C. 6 h | $KNbTiO_5$ | 1M HCl 72 h | 350° C. 2 h |
| Example 1-3 | 1150° C. 12 h | 600° C. 6 h | $KNbTiO_5$ | 1M HCl 72 h | 500° C. 2 h |
| Example 1-4 | 1150° C. 12 h | 600° C. 6 h | $KNbTiO_5$ | 1M HCl 72 h | 600° C. 2 h |
| Comparative Example 1 | 1150° C. 12 h | 600° C. 6 h | $KNbTiO_5$ | 1M HCl 72 h | 800° C. 2 h |
| Example 2-1 | 1150° C. 12 h | 1000° C. 6 h | $KNbTiO_5$ | 1M HCl 72 h | 350° C. 2 h |
| Example 2-2 | 1150° C. 12 h | 800° C. 6 h | $KNbTiO_5$ | 1M HCl 72 h | 350° C. 2 h |
| Example 2-3 | 1150° C. 12 h | 400° C. 6 h | $KNbTiO_5$ | 1M HCl 72 h | 350° C. 2 h |
| Example 3-1 | 1150° C. 12 h | 600° C. 6 h | $KNb_{0.99}Ta_{0.01}TiO_5$ | 1M HCl 72 h | 350° C. 2 h |
| Example 3-2 | 1150° C. 12 h | 600° C. 6 h | $KNb_{0.95}Ta_{0.05}TiO_5$ | 1M HCl 72 h | 350° C. 2 h |
| Example 3-3 | 1150° C. 12 h | 600° C. 6 h | $KNb_{0.90}Ta_{0.10}TiO_5$ | 1M HCl 72 h | 350° C. 2 h |
| Example 3-4 | 1150° C. 12 h | 600° C. 6 h | $KNb_{0.75}Ta_{0.25}TiO_5$ | 1M HCl 72 h | 350° C. 2 h |
| Example 3-5 | 1150° C. 12 h | 600° C. 6 h | $KNb_{0.5}Ta_{0.5}TiO_5$ | 1M HCl 72 h | 350° C. 2 h |
| Example 3-6 | 1150° C. 12 h | 600° C. 6 h | $KTaTiO_5$ | 1M HCl 72 h | 350° C. 2 h |
| Example 4 | 1150° C. 12 h | 600° C. 6 h | $KNbTiO_5$ | 4M $HNO_3$ 36 h | 350° C. 2 h |
| Comparative Example 2 | 1150° C. 24 h | — | $KNbTiO_5$ | 1M HCl 72 h | 350° C. 2 h |
| Comparative Example 3 | 1150° C. 24 h | — | $KNbTiO_5$ | 4M $HNO_3$ 36 h | 350° C. 2 h |

In each of the examples and comparative examples described above, the washing of the proton-exchanged powder was performed until the pH of the cleaning solution reached 6 to 7. A part of each proton-exchanged powder after washing was collected and subjected to ICP analysis. The results showed that the amount of residual potassium in each proton-exchanged powder was less than 0.5 mol %.

[Analysis]

The samples of the active materials of Examples 1-1 to 1-4, Comparative example 1, Examples 2-1 to 2-3, Examples 3-1 to 3-6, Example 4, and Comparative examples 2 and 3 were subjected to powder X-ray diffraction measurement as follows.

First, each of the samples was ground to an average particle size of about 10 μm. A holder portion with a depth of 0.2 mm formed on a glass sample plate was filled with each ground sample. Then, another glass plate was pressed against each sample to smooth the surface thereof. After that, the glass plate filled with each sample was placed in a powder X-ray diffractometer and a diffraction pattern was obtained using Cu-Kα rays.

As described above, the composition of each of the active materials was analyzed by the ICP method.

As a result, the crystal phases of the active materials were identified from the information on peak position and peak intensity as follows. The active material of Example 1-1 was a mixed phase of HNbTiO and $Ti_2Nb_2O_9$. The active material of Example 1-2 was a single phase of $Ti_2Nb_2O_9$. In the active material of Example 1-3, a phase of $TiNb_2O_7$ was slightly formed together with the main phase of $Ti_2Nb_2O_9$. The active material of Example 1-4 was a mixed phase of $Ti_2Nb_2O_9$, $TiNb_2O_7$, and $TiO_2$. In the active material of Comparative example 1, the main phase was $TiNb_2O_7$ and the main phase was in the state where it was slightly mixed with $TiO_2$. The results show that the state of the phase formed in the composite oxide having an orthorhombic structure was able to be controlled by changing the heat treatment condition.

The crystal phases of the active materials of Examples 2-1 to 2-3, Examples 3-1 to 3-6, Example 4, and Comparative examples 2 and 3 are respectively shown in Table 3 below. Note that although the active materials of Examples 3-1 to 3-6 contained Ta, all the active materials had the same phase as the phase $Ti_2Nb_2O_9$. Accordingly, in Table 3, the active materials of Examples 3-1 to 3-6 are designated as the phase "$Ti_2Nb_2O_9$".

Furthermore, regarding the samples of the active materials of the active materials of Examples 1-1 to 1-4, Comparative example 1, Examples 2-1 to 2-3, Examples 3-1 to 3-6, Example 4, and Comparative examples 2 and 3, the valence of Nb was determined by the method described above. In Table 3 below, in the case of the active material having a valence of niobium (Nb) in the composite oxide $Ti_2Nb_2O_9$ having an orthorhombic structure of less than 4.95, the reduction of Nb is evaluated as "Yes", meanwhile, in the case of the active material having a valence of niobium (Nb) of 4.95 or more, the reduction of Nb is evaluated as "No".

TABLE 3

| | Crystal phase | Reduction of Nb |
|---|---|---|
| Example 1-1 | $HNbTiO_5$ + $Ti_2Nb_2O_9$ | No |
| Example 1-2 | $Ti_2Nb_2O_9$ | No |

TABLE 3-continued

| | Crystal phase | Reduction of Nb |
|---|---|---|
| Example 1-3 | $Ti_2Nb_2O_9$ + $TiNb_2O_7$ + $TiO_2$ | No |
| Example 1-4 | $Ti_2Nb_2O_9$ + $TiNb_2O_7$ + $TiO_2$ | No |
| Comparative Example 1 | $TiNb_2O_7$ + $TiO_2$ | No |
| Example 2-1 | $Ti_2Nb_2O_9$ | No |
| Example 2-2 | $Ti_2Nb_2O_9$ | No |
| Example 2-3 | $Ti_2Nb_2O_9$ | No |
| Example 3-1 | $Ti_2Nb_2O_9$ | No |
| Example 3-2 | $Ti_2Nb_2O_9$ | No |
| Example 3-3 | $Ti_2Nb_2O_9$ | No |
| Example 3-4 | $Ti_2Nb_2O_9$ | No |
| Example 3-5 | $Ti_2Nb_2O_9$ | No |
| Example 3-6 | $Ti_2Nb_2O_9$ | No |
| Example 4 | $Ti_2Nb_2O_9$ | No |
| Comparative Example 2 | $Ti_2Nb_2O_9$ | Yes |
| Comparative Example 3 | $Ti_2Nb_2O_9$ | Yes |

[Test]

(Production of Electrode)

Electrode of each of the examples and comparative examples was produced by the following procedure using each of the active materials of the Examples and Comparative examples.

First, acetylene black as a conductive agent was added to each of the active materials of the Examples and Comparative examples in an amount of 10 parts by weight with respect to each of the active materials. The resultant mixture was dispersed in N-methyl-2-pyrrolidone (NMP). Further, polyvinylidene fluoride (PVdF) as a binder was added to the dispersion in an amount of 10 parts by weight with respect to each of the active materials to prepare an electrode slurry.

This slurry was applied to an aluminum foil current collector using a blade. The thus obtained coated film was dried in vacuum at 130° C. for 12 hours. After drying, the coated film was pressed into an electrode density of 2.2 g/cm³ to form an electrode.

(Production of Electrochemical Measurement Cell)

Each of the thus produced electrodes of the examples and comparative examples, a metal lithium foil as a counter electrode, and a nonaqueous electrolyte were used to produce electrochemical measurement cells of the examples and comparative examples. The used nonaqueous electrolyte was prepared by dissolving 1 M lithium hexafluorophosphate in a mixed solvent of ethylene carbonate and diethyl carbonate (at a volume ratio of 1:1).

(Electrochemical Measurement)

Each of the electrochemical measurement cells of the examples and comparative examples was subjected to a charge-and-discharge test at room temperature. The charge-and-discharge test was carried out at a potential range of from 1.0 V to 3.0 V relative to a metal lithium electrode and at a charge-and-discharge current value (hourly discharge rate) of 0.2 C.

Subsequently, the charge-and-discharge cycle was repeated 100 times, and the discharge capacity retention ratio after 100 cycles was examined. The charge-and-discharge cycle was carried out at a potential range of from 1.0 V to 3.0 V relative to a metal lithium electrode and at a current value (hourly discharge rate) of 1 C and at room temperature (25° C.). In order to identify the discharge capacity retention ratio after 100 cycles, the charge-and-discharge process was carried out again at 0.2 C (hourly discharge rate). The discharge capacity in this discharge was divided by a discharge capacity at the first cycle (100%) to obtain the capacity retention ratio.

As an indicator of rate performance, the ratio of the discharge capacity at 0.2 C and the discharge capacity at 1.0 C was calculated.

The results of the electrochemical measurement described above are shown in Table 4 below.

TABLE 4

|  | Discharge Capacity at First Cycle (mAh/g) | Initial Efficiency of Discharge/Charge (%) | Capacity Retention Ratio after 50 Cycles (%) | Ratio of Discharge Capacities at 1 C/0.2 C (%) |
| --- | --- | --- | --- | --- |
| Example 1-1 | 235 | 86.5 | 92.3 | 96 |
| Example 1-2 | 273 | 91.2 | 98.2 | 97 |
| Example 1-3 | 248 | 88.9 | 97.5 | 97 |
| Example 1-4 | 223 | 89.5 | 96.3 | 95 |
| Comparative Example 1 | 221 | 90.1 | 86.5 | 93 |
| Example 2-1 | 242 | 90.5 | 91.5 | 95 |
| Example 2-2 | 265 | 91.3 | 97.6 | 95 |
| Example 2-3 | 254 | 90.9 | 93.2 | 96 |
| Example 3-1 | 264 | 91.1 | 91.1 | 98 |
| Example 3-2 | 251 | 92.0 | 92.5 | 98 |
| Example 3-3 | 246 | 92.1 | 96.7 | 98 |
| Example 3-4 | 239 | 92.5 | 97.6 | 97 |
| Example 3-5 | 235 | 92.6 | 95.5 | 98 |
| Example 3-6 | 225 | 92.3 | 94.8 | 98 |
| Example 4 | 268 | 90.8 | 92.0 | 96 |
| Comparative Example 2 | 212 | 88.5 | 80.5 | 85 |
| Comparative Example 3 | 205 | 88.4 | 78.9 | 82 |

<Results>

The results of Table 4 show that the electrochemical measurement cells of the examples were superior to those of the comparative examples in terms of the discharge capacity at the first cycle, the capacity retention ratio after 50 cycles, and the ratio of discharge capacity at 1 C to discharge capacity at 0.2 C.

That is, it is found that the active materials of the examples have an excellent discharge capacity, and thereby, can achieve a nonaqueous electrolyte battery which can exhibit a high energy density. Further, it is found that the active materials of the examples are excellent in cycle life an indicator of which is the capacity retention ratio after 50 cycles and rate characteristics an indicator of which is the ratio of discharge capacity at 1 C to discharge capacity at 0.2 C, and thereby, can achieve a nonaqueous electrolyte battery which can exhibit excellent rapid charge-and-discharge performance.

On the other hand, in the electrochemical measurement cell of Comparative example 1, the electrode of Comparative example 1 does not include the composite oxide $Ti_2Nb_2O_9$ having an orthorhombic structure, and thus the electrochemical characteristics thereof were inferior to those of the cells of the Examples.

Furthermore, in the electrochemical measurement cells of Comparative examples 2 and 3, the valence of niobium Nb in the composite oxide $Ti_2Nb_2O_9$ having an orthorhombic structure was less than 4.95, and thus the electrochemical characteristics thereof were inferior to those of the cells of the Examples.

The results of Tables 2 and 3 show that the active materials including the composite oxide $Ti_2Nb_2O_9$ having an orthorhombic structure which had a valence of Nb of 4.95 or more were obtained by appropriately combining the synthesis conditions of the active materials. On the other hand, it is found that, in the synthesis of each precursor, when the annealing process after sintering was omitted, a precursor in which Nb is reduced was formed, and an active material synthesized using such a precursor includes the composite oxide $Ti_2Nb_2O_9$ having an orthorhombic structure which has a valence of Nb of less than 4.95, i.e., Nb is excessively reduced as compared to the stoichiometric ratio.

The active material of at least one of the embodiments and the examples described above includes a composite oxide having an orthorhombic structure which is represented by the general formula $Ti_2(Nb_{1-x}Ta_x)_2O_9$ ($0 \leq x \leq 1$) and has an average valence of Nb and/or Ta of 4.95 or more. Therefore, the active material according to the first embodiment can achieve a nonaqueous electrolyte battery which can exhibit excellent rapid charge-and-discharge performance and high energy density.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
    A) a composite oxide having an orthorhombic structure which is represented by the general formula $Ti_2(Nb_{1-x}Ta_x)_2O_{9+\delta}$ ($0<x\leq1$ and $-0.3\leq\delta\leq0.3$) and has an average valence of niobium and/or tantalum from 4.95 to 5; and
    B) at least one selected from the group consisting of a composite oxide represented by the general formula $H(Nb_{1-x}Ta_x)TiO_5$ ($0<x\leq1$), a composite oxide represented by the general formula $Ti(Nb_{1-x}Ta_x)_2O_7$ ($0<x\leq1$), and $TiO_2$.

2. The active material according to claim 1, comprising the composite oxide represented by the general formula $H(Nb_{1-x}Ta_x)TiO_5$ ($0<x\leq1$).

3. The active material according to claim 1, wherein the composite oxide having an orthorhombic structure has a symmetry belonging to the space group Pnmm or Pn2$_1$m.

4. A nonaqueous electrolyte battery comprising
    a positive electrode;
    a negative electrode comprising the active material according to claim 1; and
    a nonaqueous electrolyte.

5. A battery pack comprising
    the nonaqueous electrolyte battery according to claim 4.

6. The battery pack according to claim 5, further comprising a protective circuit which configured to detect a voltage of the nonaqueous electrolyte battery.

7. A battery pack comprising a plurality of nonaqueous electrolyte batteries, each of the plurality of nonaqueous electrolyte batteries comprising: a positive electrode: a negative electrode comprising the active material according to claim 1; and a nonaqueous electrolyte, wherein
    the plurality of nonaqueous electrolyte batteries are electrically connected to each other in series and/or parallel.

8. The active material according to claim 1, wherein x in the general formula $Ti_2(Nb_{1-x}Ta_x)_2O_{9+\delta}$ is $0.01 \leq x \leq 1$.

9. The active material according to claim 1, wherein x in the general formula $Ti_2(Nb_{1-x}Ta_x)_2O_{9+\delta}$ is $0<x\leq0.5$.

10. The active material according to claim 1, wherein x in the general formula $Ti_2(Nb_{1-x}Ta_x)_2O_{9+\delta}$ is $0.01 \leq x \leq 0.5$.

11. The active material according to claim 1, wherein the average valence of niobium and/or tantalum is 4.98 or more.

12. The active material according to claim 1, comprising the composite oxide represented by the general formula $Ti(Nb_{1-x}Ta_x)_2O_7$ ($0 < x \leq 1$).

13. The active material according to claim 1, comprising the $TiO_2$.

14. An electrode comprising the active material according to claim 1.

15. A vehicle comprising the battery pack according to claim 5.

16. The vehicle according to claim 15, which comprises a mechanism configured to convert kinetic energy of the vehicle into regenerative energy.

17. The active material according to claim 1, wherein $\delta = -0.3$.

18. The active material according to claim 1, wherein $\delta \neq 0$.

19. The active material according to claim 1, wherein x in the general formula $Ti_2(Nb_{1-x}Ta_x)_2O_{9+\delta}$ is $0.05 \leq x \leq 1$.

* * * * *